US008676425B2

(12) United States Patent
Jones et al.

(10) Patent No.: US 8,676,425 B2
(45) Date of Patent: *Mar. 18, 2014

(54) METHODS AND SYSTEMS FOR MAINTENANCE AND OTHER PROCESSING OF CONTAINER-GROWN PLANTS USING AUTONOMOUS MOBILE ROBOTS

(75) Inventors: Joseph L. Jones, Acton, MA (US); Clara Vu, Cambridge, MA (US); Paul E. Sandin, Brookline, NH (US); Charles M. Grinnell, Arlington, MA (US)

(73) Assignee: Harvest Automation, Inc., Billerica, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/287,612

(22) Filed: Nov. 2, 2011

(65) Prior Publication Data

US 2013/0110341 A1   May 2, 2013

(51) Int. Cl.
*G01C 22/00* (2006.01)
*G05D 1/02* (2006.01)

(52) U.S. Cl.
CPC ............ *G05D 1/0287* (2013.01); *G05D 1/0276* (2013.01); *G05D 2201/0201* (2013.01); *G05D 2201/0207* (2013.01); *G05D 2201/0216* (2013.01)
USPC ............................... 701/23; 701/27; 701/114

(58) Field of Classification Search
CPC ................ G05D 1/278; G05D 1/0276; G05D 2201/0201; G05D 2201/0207; G05D 2201/0216
USPC ............................................. 701/23, 27, 114
See application file for complete search history.

(56) References Cited

U.S. PATENT DOCUMENTS

| 3,913,758 A | 10/1975 | Faircloth et al. |
| 4,476,651 A | 10/1984 | Drury |
| 4,700,301 A | 10/1987 | Dyke |

(Continued)

FOREIGN PATENT DOCUMENTS

| JP | 03-285602 A | 12/1991 |
| JP | 07-065908 | 3/1995 |

(Continued)

OTHER PUBLICATIONS

International Seaching Authority, Written Opinion of the International Searching Authorit, International Application No. PCT/US2009/001031, mailed Apr. 20, 2009, all pages.*

(Continued)

*Primary Examiner* — Calvin Cheung
(74) *Attorney, Agent, or Firm* — Rajesh Vallabh; Foley Hoag LLP

(57) ABSTRACT

A system is provided for processing container-grown plants positioned in a given area. The system includes a processing station positioned in the area for processing the container-grown plants. It also includes one or more autonomous mobile container handling robots configured to: (i) travel to a source location in the area and pick up a container-grown plant, (ii) transport the container-grown plant to the processing station where a process is performed on the container-grown plant, (iii) transport the container-grown plant from the processing station to a destination location in the area, (iv) deposit the container-grown plant at the destination location, and (v) repeat (i) through (iv) for a set of container-grown plants in the source location.

26 Claims, 4 Drawing Sheets

(56) References Cited

U.S. PATENT DOCUMENTS

| | | | |
|---|---|---|---|
| 5,016,541 A | 5/1991 | Feaster, Jr. | |
| 5,046,914 A | 9/1991 | Holland et al. | |
| 5,211,523 A | 5/1993 | Andrada Galan et al. | |
| 5,315,517 A | 5/1994 | Kawase et al. | |
| 5,403,142 A | 4/1995 | Stewart | |
| 5,602,377 A * | 2/1997 | Beller et al. | 235/462.15 |
| 5,842,306 A | 12/1998 | Onosaka et al. | |
| 5,974,348 A | 10/1999 | Rocks | |
| 5,988,971 A | 11/1999 | Fossey et al. | |
| 6,164,537 A | 12/2000 | Mariani et al. | |
| 6,212,821 B1 | 4/2001 | Adam et al. | |
| 6,243,987 B1 | 6/2001 | Hessel | |
| 6,255,793 B1 | 7/2001 | Peless et al. | |
| 6,417,641 B2 | 7/2002 | Peless et al. | |
| 6,496,755 B2 | 12/2002 | Wallach et al. | |
| 6,508,033 B2 | 1/2003 | Hessel et al. | |
| 6,611,738 B2 | 8/2003 | Ruffner | |
| 6,667,592 B2 | 12/2003 | Jacobs et al. | |
| 6,729,836 B2 | 5/2004 | Stingel, III et al. | |
| 6,850,024 B2 | 2/2005 | Peless et al. | |
| 6,854,209 B2 | 2/2005 | Van Horssen et al. | |
| 6,857,493 B2 | 2/2005 | Shupp et al. | |
| 6,915,607 B2 | 7/2005 | Tagawa et al. | |
| 6,984,952 B2 | 1/2006 | Peless et al. | |
| 7,137,770 B2 | 11/2006 | Ueda | |
| 7,184,855 B2 | 2/2007 | Stingel, III et al. | |
| 7,198,312 B2 | 4/2007 | Blaho | |
| 7,200,465 B2 | 4/2007 | Stingel, III et al. | |
| 7,506,472 B2 | 3/2009 | Leyns et al. | |
| 7,579,803 B2 | 8/2009 | Jones et al. | |
| 7,610,122 B2 | 10/2009 | Anderson | |
| 7,613,544 B2 | 11/2009 | Park et al. | |
| 2002/0022260 A1 * | 2/2002 | Ishii | 435/286.1 |
| 2002/0023788 A1 * | 2/2002 | Torrie et al. | 180/9.26 |
| 2002/0182046 A1 | 12/2002 | Schempf et al. | |
| 2003/0030398 A1 | 2/2003 | Jacobs et al. | |
| 2003/0199944 A1 | 10/2003 | Chapin et al. | |
| 2005/0090961 A1 | 4/2005 | Bonk et al. | |
| 2005/0126144 A1 | 6/2005 | Koselka et al. | |
| 2005/0135912 A1 | 6/2005 | Schempf et al. | |
| 2005/0238465 A1 | 10/2005 | Razumov | |
| 2006/0045679 A1 | 3/2006 | Ostendorff | |
| 2006/0142896 A1 * | 6/2006 | Yokoyama et al. | 700/245 |
| 2006/0257236 A1 | 11/2006 | Stingel et al. | |
| 2006/0293810 A1 | 12/2006 | Nakamoto | |
| 2007/0042803 A1 | 2/2007 | Anderson | |
| 2007/0129849 A1 | 6/2007 | Zini et al. | |
| 2009/0021351 A1 | 1/2009 | Beniyama et al. | |
| 2009/0214324 A1 * | 8/2009 | Grinnell et al. | 414/467 |
| 2009/0254217 A1 | 10/2009 | Pack et al. | |
| 2011/0025454 A1 | 2/2011 | Pomerantz et al. | |
| 2012/0114187 A1 * | 5/2012 | Duarte | 382/110 |
| 2013/0325159 A1 * | 12/2013 | Kilibarda et al. | 700/114 |

FOREIGN PATENT DOCUMENTS

| | | | |
|---|---|---|---|
| JP | 11-077579 | 3/1999 | |
| JP | 2006-346767 A | 12/2006 | |
| JP | 2007-508667 A | 4/2007 | |
| JP | 2009-511288 A | 3/2009 | |
| WO | 94/22094 A1 | 9/1994 | |
| WO | WO94/22094 * | 9/1994 | G06F 15/20 |
| WO | 2007/004551 A1 | 1/2007 | |
| WO | 2009/024246 A1 | 2/2009 | |

OTHER PUBLICATIONS

International Search Report and Written Opinion for PCT/US2012/057506, dated Mar. 29, 2013.

* cited by examiner

METHODS AND SYSTEMS FOR MAINTENANCE AND OTHER PROCESSING OF CONTAINER-GROWN PLANTS USING AUTONOMOUS MOBILE ROBOTS

BACKGROUND

The present application relates generally to plant nursery operations and, more particularly, to methods and systems utilizing autonomous mobile robots for maintenance or other processing of container-grown plants.

Automation in the nursery and greenhouse sector of the agriculture market is generally confined to large greenhouses. Such greenhouses typically utilize fixed rails and conveyors to move plant-holding containers about the greenhouse, where various processes are performed on the plants as they mature. The controlled, indoor environment of the greenhouse is conducive to implementation of automatic machinery that can bring needed resources to each plant, and also transport plants to particular machines such as vision systems used for grading and sorting plants.

Growers whose products are grown mostly on large outdoor fields (typical of many operators in the United States) make do with manual labor. Automated machinery and vision systems developed for indoor use are not generally used by outdoor growers as these systems are not well-suited to work in uncontrolled and unstructured environments.

BRIEF SUMMARY OF THE DISCLOSURE

In accordance with one or more embodiments, a system is provided for processing container-grown plants positioned in a given area. The system includes a processing station positioned in the area for processing the container-grown plants. It also includes one or more autonomous mobile container handling robots configured to: (i) travel to a source location in the area and pick up a container-grown plant, (ii) transport the container-grown plant to the processing station where a process is performed on the container-grown plant, (iii) transport the container-grown plant from the processing station to a destination location in the area, (iv) deposit the container-grown plant at the destination location, and (v) repeat (i) through (iv) for a set of container-grown plants in the source location.

In accordance with one or more further embodiments, a method is provided for processing container-grown plants positioned in a given area. The method includes the steps of: (a) picking up a container-grown plant at a source location in the area and transporting the container-grown plant to a processing station using an autonomous mobile robot; (b) processing the container-grown plant at the processing station; (c) transporting the container-grown plant from the processing station to a destination location in the area and depositing the container-grown plant at the destination location using an autonomous mobile robot; and (d) repeating steps (a) through (c) for a set of container-grown plants in the source location.

DETAILED DESCRIPTION

Various embodiments disclosed herein are directed to automated techniques for maintenance or other processing of container-grown plants in a variety of environments, including outdoor and unstructured environments. Such techniques allow growers, especially outdoor growers, to achieve enhanced productivity, improved plant quality, and more efficient resource usage. The techniques are also scalable, allowing users to implement as much or as little automation as needed.

The automation techniques are especially useful for container-grown plants on outdoor growing fields or beds. When the plants need care of some sort or other processing, one or more autonomous mobile robots pick up containers holding the plants and transport them to a processing station, where desired operations are performed on the plants. The robot that carried the plant or another robot then transports the plant to a given destination location in the growing field. The autonomous robots replace human labor needed to transport containers. The versatility and adaptability of the robots makes it possible to implement the automation techniques in unstructured outdoor environments.

Processing stations in accordance with various embodiments provide a variety of features and resources enabling improved production of plants. They provide a controlled environment that is otherwise available only indoors, allowing a variety of processes to be performed on the plants. Such processes can include, among others, automated plant grading or sorting using machine vision techniques. The processing stations in some embodiments are mobile.

The processing stations provide an enclosure in which the plants can be provided a variety of substances they need for proper growth such as, e.g., water, pesticides, or other chemicals or compounds. The amount of a substance to be dispensed on each plant can, in some embodiments, be determined based on readings from sensors in the station or on the robot. Alternatively, the amount of the substance to be dispensed can be programmed by a user. The processing stations reduce resource use and reduce or avoid contamination of the surrounding environment and workers' exposure to undesirable chemicals.

Plants and/or containers can be physically altered within processing stations to aid in production. Alteration can include, e.g., trimming the plant or repotting the plant. The station can manage the materials added or removed from the process.

Non-limiting examples are provided below illustrating automation techniques in accordance with various embodiments.

Example 1

Figure 1:
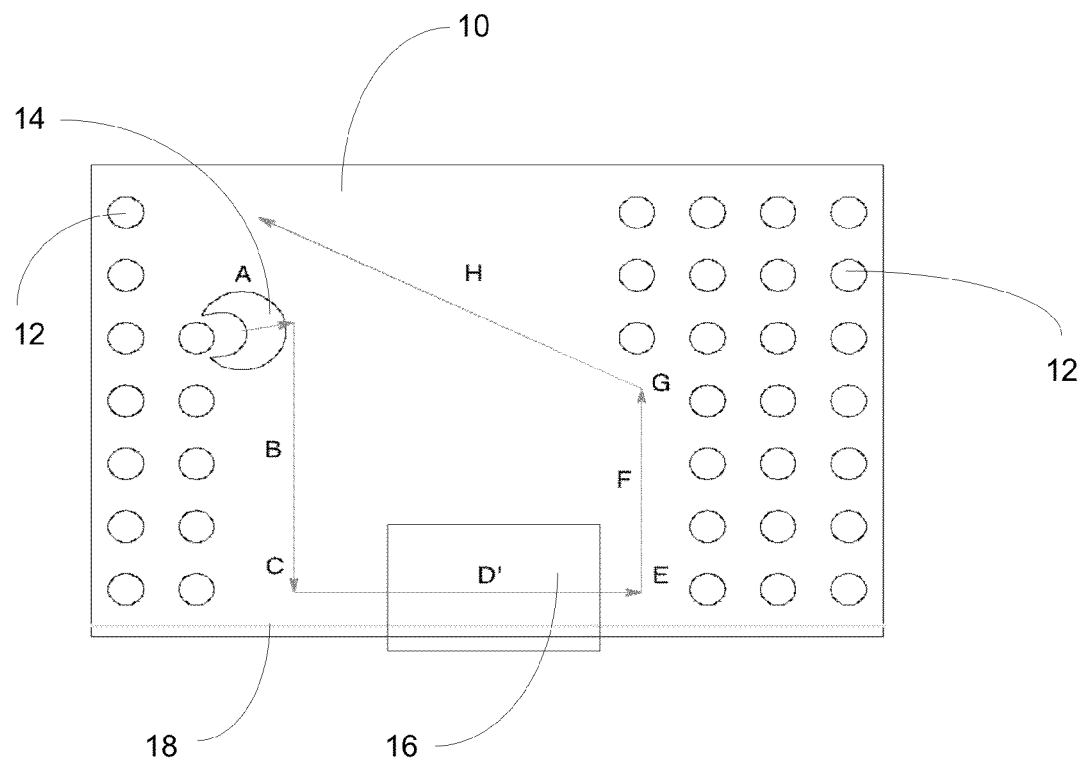
FIG. 1 is high-level diagram illustrating a first example of an automated plant processing operation in accordance with one or more embodiments.

FIG. 1 illustrates an example of an automated plant maintenance or other processing operation in accordance with one or more embodiments. A growing field or bed 10 includes a plurality of plant-holding containers 12. One or more robots 14 (only one is shown in this example) pick up plant-holding containers (one or a small number at a time) in a pickup or source region (shown on the left side of the field in the figure) of the growing field 10. The robot 14 transports the plant-holding containers through a processing station 16, where one or more plant maintenance or other processes are carried out. After exiting the processing station, the robot 14 deposits the plant-holding containers in a destination region (shown on the right side of the field in figure) of the growing field 10. As discussed below, a boundary marker 18 detectable by the robot 14 can be used by the robot to locate the processing station 16 and, in some embodiments, to locate the source of destination locations.

As shown in FIG. 1, at step A, the robot picks up a plant-holding container 12 in the source region of the growing field and backs away from the container pickup point. At step B, the robot turns in a direction toward the boundary marker 18 and drives forward until robot sensors detect the boundary marker. Once the boundary marker is detected, the robot aligns with the boundary marker at step C. The robot follows the boundary marker using the sensors to drive along the boundary while keeping a set distance from the boundary. In this example, the boundary marker passes through the processing station. The robot follows the boundary marker and thereby passes through the processing station. As the robot passes through the processing station, at step D', an operation is performed on the plant. Non-limiting examples of operations include, spraying the plant with pesticides or herbicides, watering, pruning, mechanical weeding, grading, and sorting. After exiting the station, at step E, the robot detects and aligns itself with a row of containers in the destination area of the growing field that have already been processed at the station. At step F, the robot moves along the row until it detects an available space for the container it carries. At step G, the robot deposits the container. At step H, the robot returns to the source area of the growing field to detect and collect another plant-holding container 12 for processing.

In accordance with one or more embodiments, the robot communicates with the processing station as the robot passes through it. The station may detect the presence of the robot and activate some operation, e.g., spraying. The station may direct the robot to move in a particular way (slower, faster, turning left or right, etc.) as the robot passes through to improve performance of the operation.

The robot may be equipped with condition detecting sensors to sense some condition of the plant as it carries the plant (e.g., the moisture content or soil pH). In this case, the robot can communicate the needs of the plant to the station. The station then applies an appropriate amount of water, nutrient, or other substance (or takes some other action) as the robot carries the plant through the station. Alternatively, the processing station may be equipped with sensors to detect plant conditions.

In accordance with one or more embodiments, the robot and the processing station can communicate, if needed, using a wireless communications system such as a radio frequency (RF) based communication system (e.g., WiFi or other wireless standard) or an infrared (IR) or other system.

Example 2

Figure 2:
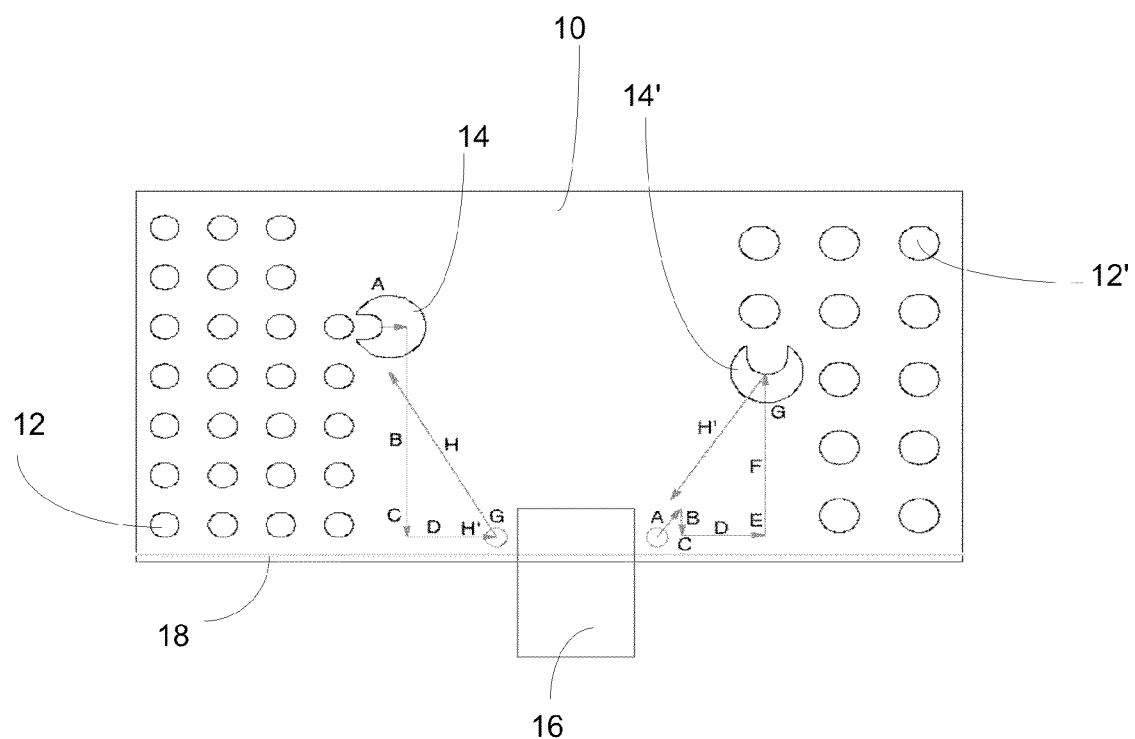
FIG. 2 is high-level diagram illustrating a second example of an automated plant processing operation in accordance with one or more embodiments.

In this example illustrated in FIG. 2, a robot picks up a plant-holding container on the field and leaves the container at the processing station. Either the same or a different robot 14' then retrieves the container from the processing station after some operation has been performed, and deposits the container on the field. This method is particularly suitable for operations that require robots picking up and depositing containers to be configured differently. It is also suitable for processing operations that are better performed without involvement of the robot.

For certain types of maintenance or other operations, it may be advantageous to use differently configured robots to carry containers to and from the processing station. For example, when plants need to be repotted, the plants will typically be in smaller containers when they arrive at the processing station and in larger containers when they leave. In this example, robot with a small gripper spacing can be used to deliver containers to the processing station. A robot with a larger gripper spacing picks up containers from the station and returns them to the field.

Repotting is an example of a typically manual operation. The robots can work in a system with either manual or automated processing stations.

Additionally, some kinds of operations require the station to perform multiple tasks that can be done in sequence to the plant. As an example, if three tasks are performed within the station, each taking 10 seconds, it may be more efficient to have robots drop off and pick up plants every 10 seconds than to have each robot wait for the 30 second operation time within the station.

As shown in FIG. 2, at step A, the robot picks up a plant-holding container 12 and backs away from the container pickup point. At step B, the robot turns toward the boundary marker 18 and drives forward until robot sensors detect the boundary marker. Once the boundary marker is detected, the robot aligns with the boundary at step C, and moves to the processing station at step D. At step H', the robot leaves the container at the station. At steps G and H, the robot turns and moves towards the pickup area to collect another plant-holding container 12 for delivery to the station.

Once an operation has been performed on the plant, it is picked up by the same or different robot from the processing station and deposited in the destination area of the field as described in Example 1.

Example 3

Figure 3:
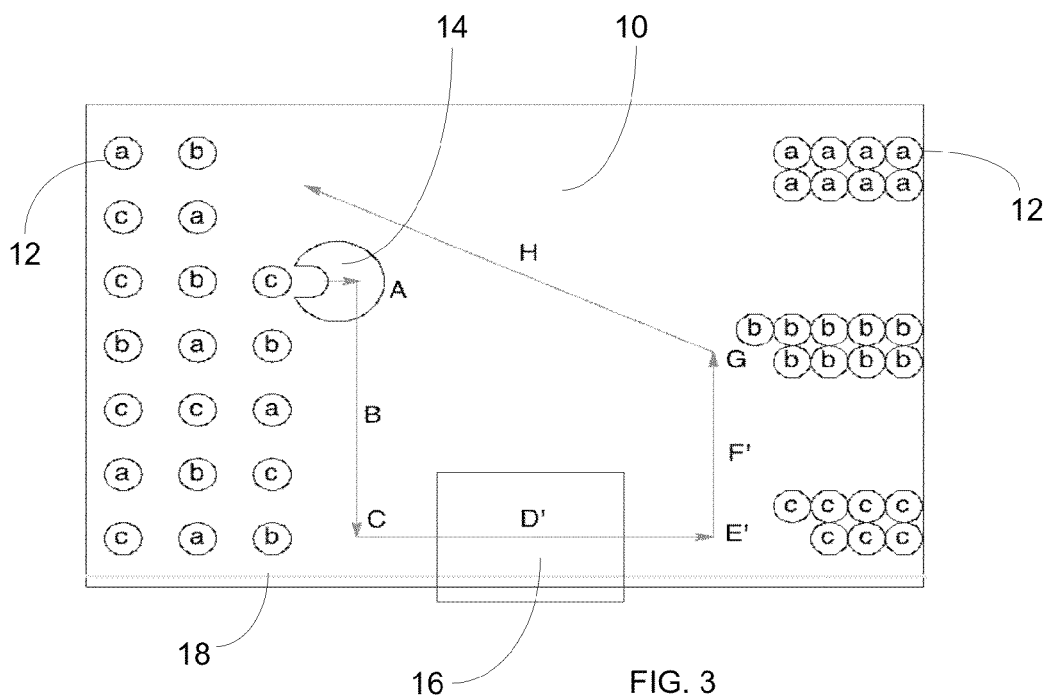
FIG. 3 is high-level diagram illustrating a third example of an automated plant processing operation in accordance with one or more embodiments.

FIG. 3 illustrates an example of a process used for grading and sorting plants in accordance with one or more embodiments. Plants with different characteristics (e.g., different height, different number of blossoms, etc.—identified in the figure by a, b, and c) are intermingled on the left side of the field. The robot carries the plants through the processing station, which identifies the grade of the plant. Once identified, the station communicates the grade of the plant to the robot. The robot then selectively deposits the plants on the field such that plants of the same grade are aggregated in one place.

State-of-the-art vision equipment typically requires a known, uniform background and controlled lighting in order to classify plants reliably. The contained environment of the maintenance station can provide these conditions in an outdoor field. This enables use of existing vision-based solutions in outdoor environments.

In all the examples described above, the processing station can be either manual or automatic. Further, the station can be mobile and can either advance itself automatically down the field by following the boundary marker (in generally the same way as robots using a boundary detection system) or it can be manually moved into a new position as required.

One or many robots can be used simultaneously in the automated plant processing operations in accordance with various embodiments. Increasing the number of robots increases throughput up to a point.

The plant-holding containers that are collected or deposited by robots can have either compact or distributed spacing arrangements on the field. For example, in FIG. 3 the containers being picked up by robots in the pickup or source area of the field have a distributed spacing arrangement, and the containers deposited by the robots in the destination area of the field have a compact spacing arrangement.

In various examples described above, the source area of the containers, the robot, the station, and the destination area of the containers are all located on a contiguous, relatively flat surface of an outdoor field or bed. It should be understood that the automated processes in accordance with various embodiments can also be implemented indoors, e.g., on the floor of a greenhouse.

A variety of autonomous robots can be used to perform the functions described herein including, e.g., the robots disclosed in co-pending U.S. patent application Ser. No. 12/378,612 filed on Feb. 18, 2009 and entitled ADAPTABLE CONTAINER HANDLING SYSTEM and U.S. patent application Ser. No. 13/100,763 filed on May 4, 2011 and entitled ADAPTABLE CONTAINER HANDLING ROBOT WITH BOUNDARY SENSING SUBSYSTEM. Both applications are assigned to the assignee of the present application and are incorporated by reference herein in their entirety.

Figure 4:
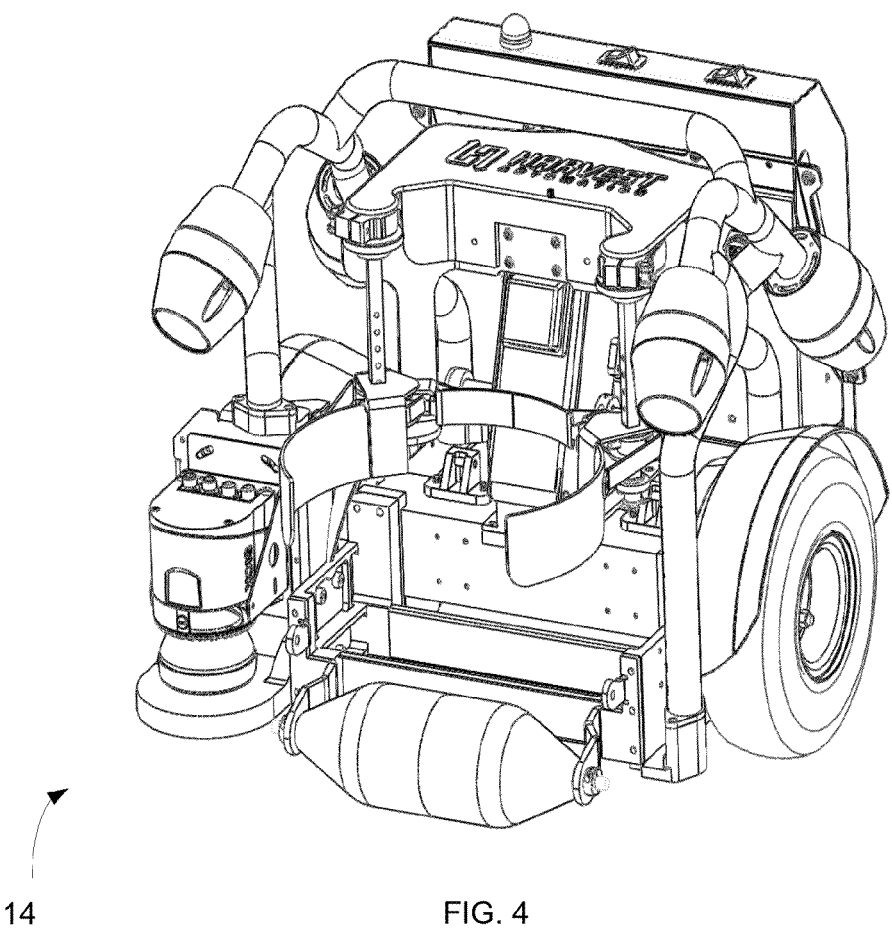
FIG. 4 is a perspective view of an exemplary autonomous mobile robot that can be used in automated plant processing operations in accordance with one or more embodiments.
Figure 5:
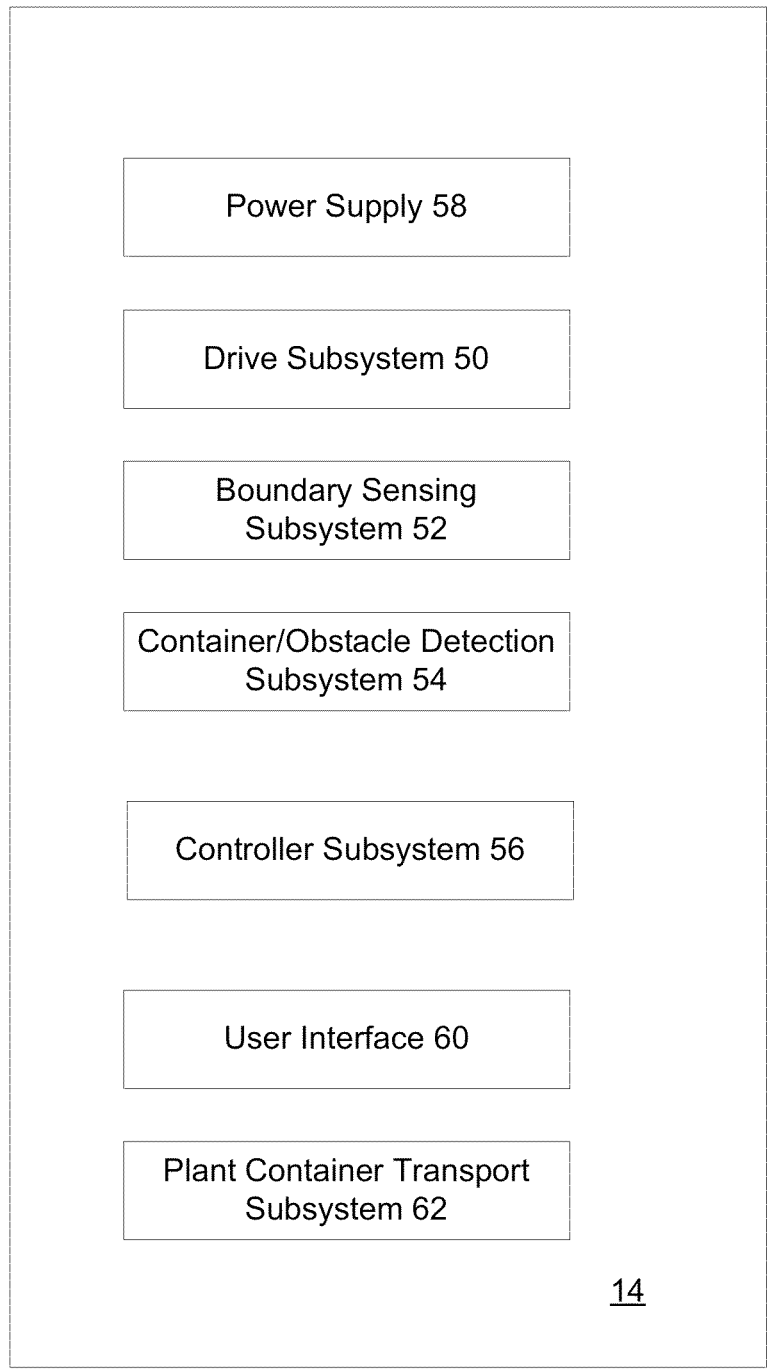
FIG. 5 is a simplified block diagram illustrating components of the exemplary autonomous mobile robot of FIG. 4.

FIG. 4 illustrates an example of a robot that can be used in the automated plant processing operations in accordance with various embodiments. FIG. 5 is a block diagram of various components of the robot. As discussed above, the robot is an autonomous mobile robot able to identify, pick up, transport, and deposit container-holding plants. The robot is also able to detect a physical marker such as a boundary marker to guide the robot to or through a processing station and locate a destination area to deposit plant-holding containers that have been processed. In some embodiments, the robot and the processing station can communicate with each other.

The robot includes a platform with a drive subsystem 50 and a boundary sensing subsystem 52 for detecting boundary markers. It also includes a container/obstacle detection subsystem 54 for detecting containers, other robots, and obstacles. The robot includes a microprocessor-based controller subsystem 56 for controlling operation of the robot in performing programmed behaviors. A power supply 58 for all the subsystems can include one or more rechargeable batteries.

In some embodiments, the drive subsystem takes the form of a differential drive comprising two coaxial wheels and a roller for balance. The wheels are driven together or independently by one or more motors and a drive train controlled by the controller subsystem.

The boundary sensing subsystem includes one or more boundary detecting sensors able to detect the position of a boundary marker. The boundary marker can comprise a retro-reflective tape or rope laid on the ground. By way of example, the boundary detecting sensors can each comprise a photo-diode-based sensor and one or more radiation sources (e.g., LEDs) to servo on the boundary marker.

The boundary marker is placed on the field to identify the edge of the field to the robot. The processing station can be positioned on the field at a location near the boundary such that the robot can find the station by following the boundary marker. Thus, if the processing operation requires robots to move containers through the station (as described in Examples 1 and 3), the station is positioned such that the robot can drive through the station while following the boundary marker. If the robots deliver containers to the station and pick them up from the station (as described in Example 2), the station can be positioned to intersect the boundary marker.

The container/obstacle detection subsystem can include one or more range sensors to detect plant-holding containers, other robots, and obstacles. In some embodiments, the range sensor is a wide-angle (120 degree) range sensor. Raw range sensor data (in the form of a list of angle and range readings) supplied by the sensor is processed by a computer processor (e.g., a processor in the controller subsystem) to return the position of containers, other robots, and obstacles.

Each robot also includes a user interface 60 allowing users to instruct the robot as to which type of action it should perform and to input the values of certain parameters. Parameters can include the diameter of a plant-holding container, the width of the field, the container putdown pattern (e.g., rectangular or hexagonal patterns), and the distance between containers in the pattern.

The robot includes a plant container transport mechanism 62, which includes a gripper controlled by the controller subsystem to grasp and pick up or deposit a plant-holding container.

The controller subsystem is configured (e.g., programmed) to perform various functions, including identifying, picking up, transporting, and depositing container-holding plants. The controller subsystem is responsive to the output of boundary sensing subsystem and the output of container/obstacle detection subsystem. The controller subsystem controls the drive subsystem (e.g., a motor) to detect and follow a boundary marker to lead the robot to a processing station or an area to pick up or deposit a plant-holding container as discussed above.

The controller subsystem can also control the drive subsystem 50 to maneuver the robot to a prescribed container source location. The system can include a radio frequency or other (e.g., infrared) beacon transmitter positioned in the source area of the field, and the robot can include a receiver for receiving a signal from the beacon transmitter to assist the robot in returning to the container source location (based, e.g., on signal strength). Dead reckoning, boundary following, and other techniques can alternatively be used to assist the robot in returning to the source of the containers.

In addition to the robots, the processing station itself can be autonomous. That is, the processing station can move along the boundary marker, proceeding toward the unprocessed plants as plants are processed and the frontier moves down the field (e.g., to the left in FIG. 1).

The robots and station are configured to coordinate their activities. Depending on the requirements of the processing task, the robot may need to stop when it is within the station. Also, an autonomous processing station may need to remain stationary while a robot is within it. In the types of processing described in Examples 1 and 3, the robot and station can communicate with each other using a wireless communication system. By way of example, the station and the robots utilize an RF-based communication system such as WiFi or another format with similar capability.

The robot can discover that it is within the station or, alternately, for the station can learn that it is currently hosting a particular robot.

Figure 6:
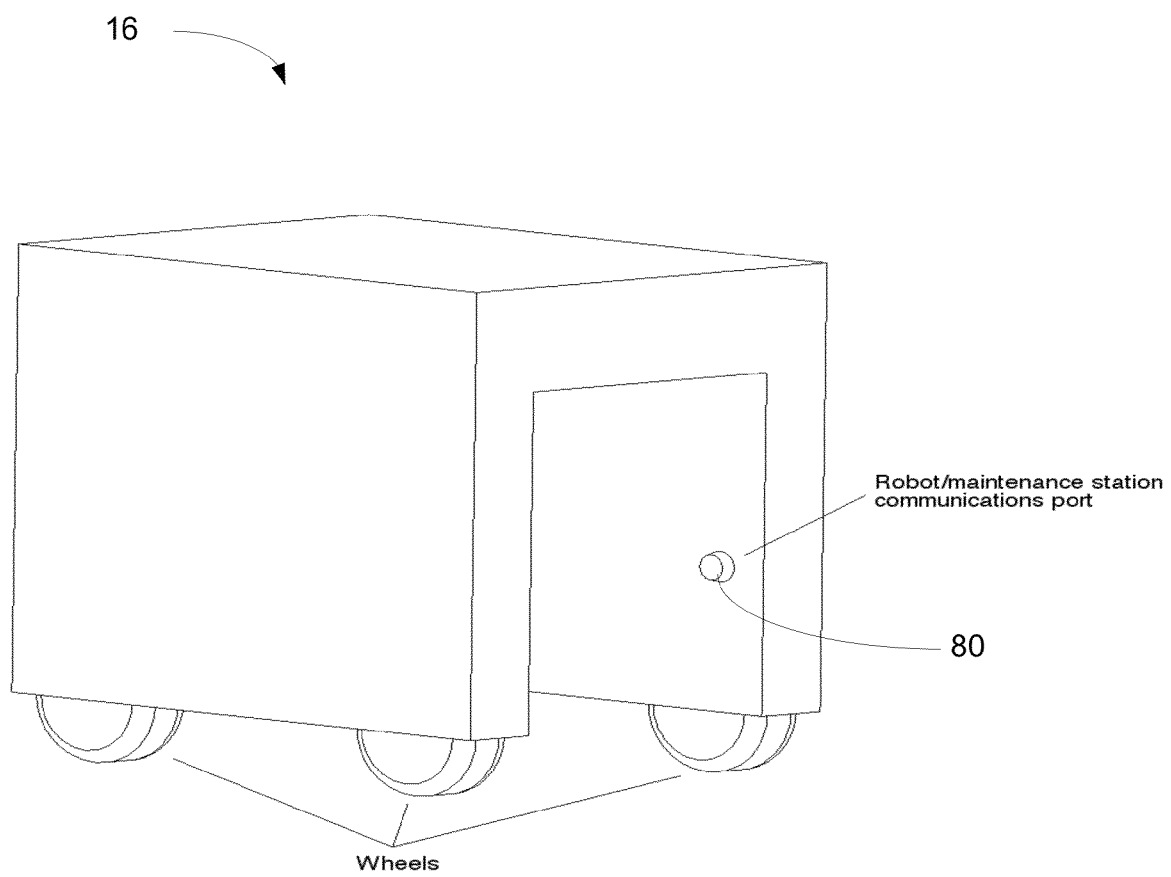
FIG. 6 is a perspective view of an exemplary processing station in accordance with one or more embodiments.

FIG. 6 is a perspective view of an exemplary processing station 16. The station 16 includes a communications port 80, shown schematically to represent an RF antenna, an IR emitter/detector, or other communication system.

In accordance with one or more embodiments, each robot includes an IR emitter able to transmit a code that uniquely identifies a particular robot. The processing station contains an IR detector able to intercept this code. Because the robots already contain IR-based boundary followers, the robot/station detection/communication system can be piggybacked on this system. The processing station is preferably able to receive the robot's IR signal only when the robot is physically within the station.

When the processing station detects a signal from its IR receiver, it determines that the robot associated with that particular signal is present. The station then uses the received code to broadcast a message over its RF link. When a robot receives a message from the station it compares its unique transmit code with the code received. Only the robot within the station has the matching code. In this way communication can be established between the robot and the station. With communication thus established, the station can instruct the robot to stop or to perform some maneuver (e.g., spin in place or otherwise move).

Alternately, all communication between robot and station can be carried out using an IR system. The system can be geometrically restricted such that there is no ambiguity, i.e., the robot and station are always correctly paired.

In accordance with one or more further embodiments, the processing station can collect and record inventory and other information on container-grown plants. Currently, nursery growers have little information or data concerning intermediate stages of plant production because such information is collected manually, which can be expensive. Nursery growers may not even know exactly how much inventory they have and where it is located on the site. In accordance with one or more embodiments, each container-grown plant includes a unique identifier (e.g., an RFID tag or a barcode or quick response code). The processing station includes a reader for reading the unique identifier. Each time a robot brings a plant to the processing station, the reader interrogates the barcode or RFID tag or other identifier associated with the container in which the plant is grown. Thus, the condition of each plant at a particular time, and operations that are performed on the plant can all be recorded. The robot or the processing station may also be configured to know the position of a container-grown plant on the site, which then ties the production information with the location of each plant within the operation. This high granularity information gives growers a better picture of the state of their business and, by relating inputs to plant response, enables growers to improve plant quality and consistency, as well as operational efficiency. The data collected by the processing station can be transmitted to a remote data processing site for evaluation.

During processing operations where robots move through the processing station (such as the operations described in Examples 1 and 3), each robot repeatedly moves between the frontiers of the processed and unprocessed containers. Twice per cycle the robot is then able to measure this distance. The robot can thus compute the distance at which the station should be positioned. If, when the robot enters the station, the station is too near or too far from the unprocessed frontier, the robot can inform the station that it should move one direction or the other. This method enables the station (which ordinarily cannot sense the container frontiers) to position itself correctly with respect to the frontiers.

Processing proceeds down the field moving toward the unprocessed plants. At some point, the robot will encounter the end of the field. The end can be indicated by a physical barrier or by a marker similar (or identical to) the boundary marker. When the robot can find no more unprocessed containers and can proceed no farther down the field without crossing the barrier or tape, the robot halts.

Having thus described several illustrative embodiments, it is to be appreciated that various alterations, modifications, and improvements will readily occur to those skilled in the art. Such alterations, modifications, and improvements are intended to form a part of this disclosure, and are intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments. Additionally, elements and components described herein may be further divided into additional components or joined together to form fewer components for performing the same functions.

The processes the robots are programmed to perform as described above may be implemented in software, hardware, firmware, or any combination thereof. The processes are preferably implemented in one or more computer programs executing on the programmable controller subsystem, which includes a processor, a storage medium readable by the processor (including, e.g., volatile and non-volatile memory and/or storage elements), and input and output devices. Each computer program can be a set of instructions (program code) in a code module resident in a random access memory. Until required, the set of instructions may be stored in another computer memory (e.g., in a hard disk drive, or in a removable memory such as an optical disk, external hard drive, memory card, or flash drive) or stored on another computer system and downloaded via the Internet or other network.

Accordingly, the foregoing description and attached drawings are by way of example only, and are not intended to be limiting.

What is claimed is:

1. A system for processing container-grown plants positioned in a given area, comprising:
   (a) a processing station positioned in the given area for processing the container-grown plants, the processing station comprising a physical structure that is configured to perform a given processing operation on the container-grown plants, wherein the physical structure is autonomous and automatically operates; and
   (b) one or more autonomous mobile container handling robots configured to:
      (i) travel to a source location in the given area and pick up a container-grown plant,
      (ii) transport the container-grown plant to the processing station where the given processing operation is performed on the container-grown plant,
      (iii) transport the container-grown plant from the processing station to a destination location in the given area,
      (iv) deposit the container-grown plant at the destination location, and
      (v) repeat (i) through (iv) for a set of container-grown plants in the source location.

2. The system of claim 1, further comprising a boundary marker that is detectable by the one or more robots to guide the one or more robots to the processing station, the destination location, or the source location.

3. The system of claim 2, wherein the boundary marker comprises a retro reflective material and the one or more robots each include a boundary detecting sensor for detecting the retro reflective material.

4. The system of claim 3, wherein the boundary detecting sensor comprises a photodiode-based sensor and one or more radiation sources to servo on the boundary marker.

5. The system of claim 1, wherein one of the one or more robots is configured to pick up a container-grown plant, carry the container-grown plant through the processing station as the container-grown plant is processed, and transport and deposit the container-grown plant in the destination area.

6. The system of claim 1, wherein one of the one or more robots is configured to deposit the container-grown plant at the processing station and the same or another of the one or more robots is configured to pick up the container-grown plant from the processing station once it has been processed to be deposited in the destination area.

7. The system of claim 1, wherein the processing station is automatically movable within the area.

8. The system of claim 1, wherein the processing station is configured to automatically move in a direction towards the source location as container-grown plants are moved from the source location to the destination location.

9. The system of claim 1, wherein the one or more robots or the processing station includes a sensor to detect a physical condition relating to the container-grown plant, and the processing station is configured to process the container-grown plant in accordance with the detected physical condition.

10. The system of claim 9, wherein the sensor for detecting a physical condition comprises a soil moisture sensor or a soil pH sensor.

11. The system of claim 1, wherein each of the one or more robots can communicate with the processing station through a wireless communication system.

12. The system of claim 11, wherein the processing station commands a robot to perform a specified action when the robot is within the processing station.

13. The system of claim 1, wherein the processing station is configured to apply a substance to a container-grown plant.

14. The system of claim 1, wherein each container-grown plant includes a machine-readable unique identifier, and wherein the processing station includes a device for reading the unique identifier of each container-grown plant processed by the processing station.

15. The system of claim 14, wherein the machine-readable unique identifier comprises a bar code, quick response code, or RFID tag.

16. The system of claim 14, wherein the processing station is configured to record or transmit to a remote data processing site the unique identifier of each container-grown plant processed by the processing station and information on the process performed.

17. The system of claim 14, wherein each of the one or more robots communicates information on the source location or the destination location of a container-grown plant to the processing station when it processes the container-grown plant, and wherein the processing station is configured to record or transmit to a remote data processing site the information with the unique identifier of the container-grown plant.

18. The system of claim 1, wherein each of the one or more robots comprises:
    a chassis;
    a plant container transport mechanism on the chassis;
    a drive subsystem for maneuvering the chassis;
    a boundary sensing subsystem on the chassis;
    a container or obstacle detection subsystem on the chassis;
    a controller on the chassis responsive to the boundary sensing subsystem and the container or obstacle detection subsystem and being configured to control the drive subsystem to travel to the source location, transport the container-grown plant to the processing station and to transport the container-grown plant from the processing station to a destination location, and to control the plant container transport mechanism pick up a container-grown plant in the source location and to deposit the container-grown plant at the destination location.

19. The system of claim 18, wherein the controller is configured to control the drive subsystem to locate and follow a boundary marker and maneuver the robot into the plant processing station to perform an operation on a plant carried by the plant container transport mechanism, and to control the drive subsystem to exit the plant processing station after the operation has been performed.

20. The system of claim 1, wherein the given area comprises an outdoor field or bed.

21. The system of claim 1, wherein the processing station is configured to weed a container-grown plant.

22. The system of claim 1, wherein the processing station is configured to re-pot a container-grown plant.

23. The system of claim 1, wherein the processing station is configured to grade a container-grown plant.

24. The system of claim 1, wherein the processing station is configured to sort a container-grown plant.

25. The system of claim 1, wherein the processing station comprises an enclosure, within which the given processing operation is performed.

26. The system of claim 1, wherein the processing station is configured to trim a container-grown plant.

* * * * *